Dec. 19, 1939.    F. C. ALARIE    2,183,527
INTERNAL COMBUSTION ENGINE
Filed Aug. 16, 1937    3 Sheets-Sheet 1
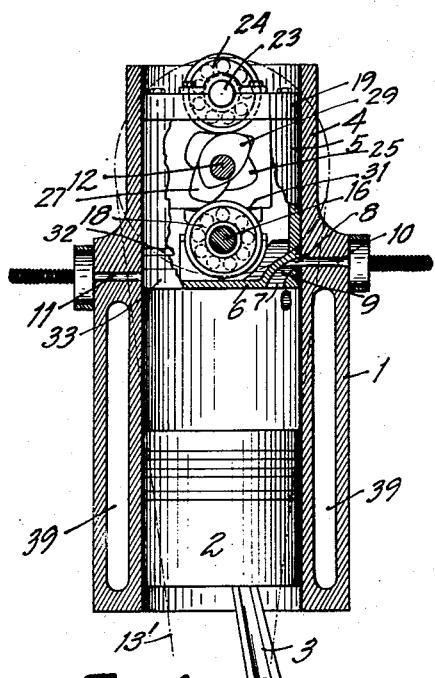
Fig.1
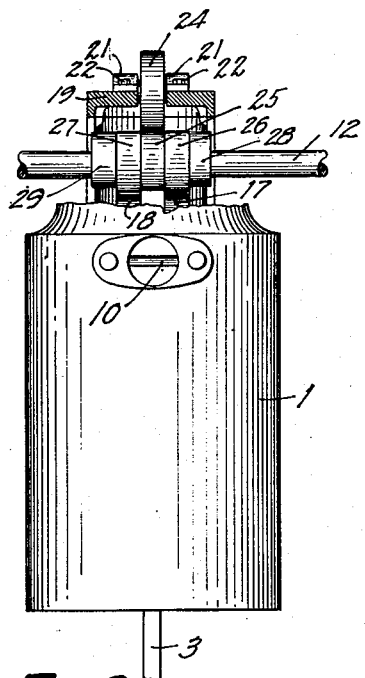
Fig.2
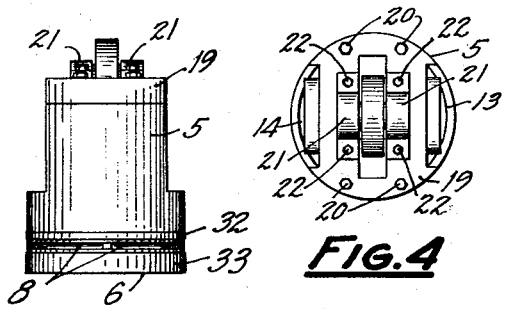
Fig.3   Fig.4   Fig.5
INVENTOR
Frank C. Alarie
By 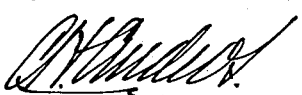
ATTORNEY Dec. 19, 1939.   F. C. ALARIE   2,183,527
INTERNAL COMBUSTION ENGINE
Filed Aug. 16, 1937   3 Sheets-Sheet 2

INVENTOR
Frank C. Alarie
BY
ATTORNEY

Dec. 19, 1939.    F. C. ALARIE    2,183,527
INTERNAL COMBUSTION ENGINE
Filed Aug. 16, 1937    3 Sheets—Sheet 3
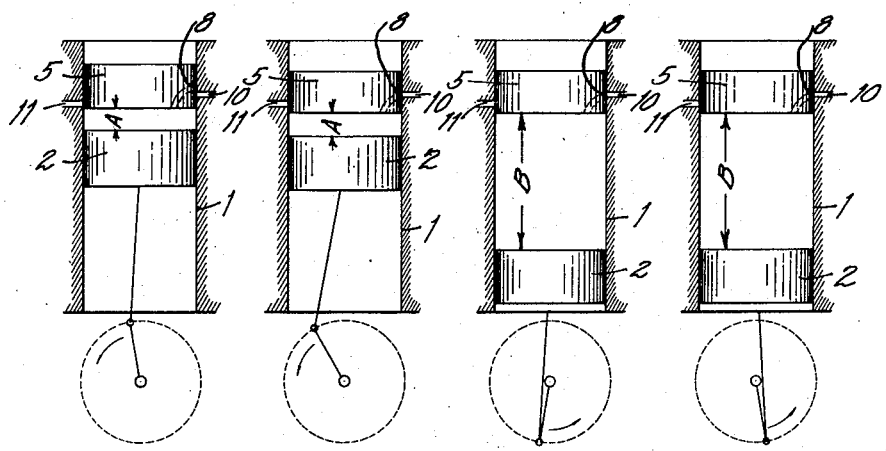
Fig.11    Fig.12    Fig.13    Fig.14
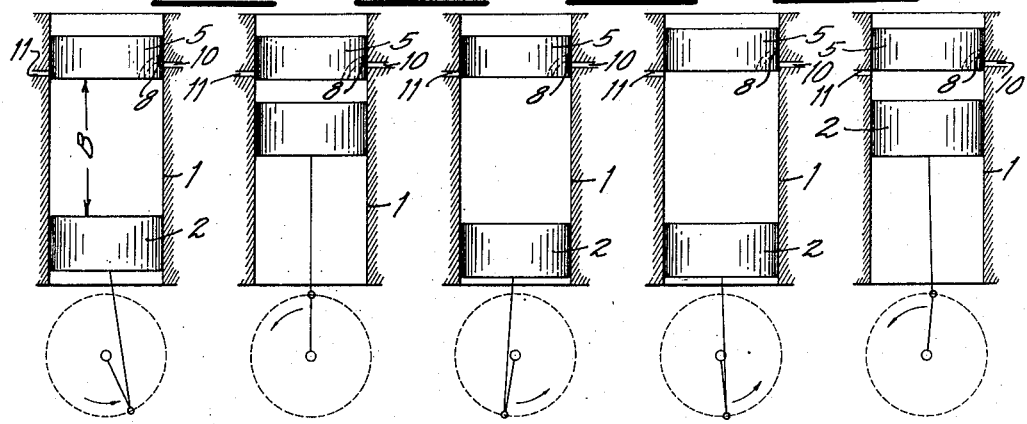
Fig.15    Fig.16    Fig.17    Fig.18    Fig.19
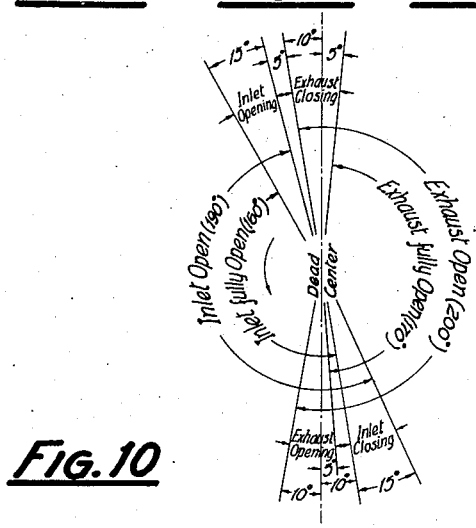
Fig.10
INVENTOR
Frank C. Alarie
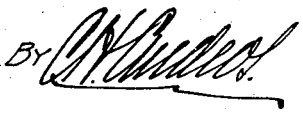
ATTORNEY Patented Dec. 19, 1939

2,183,527

UNITED STATES PATENT OFFICE 2,183,527

INTERNAL COMBUSTION ENGINE

Frank C. Alarie, Miami, Fla.

Application August 16, 1937, Serial No. 159,224

12 Claims. (Cl. 123—78)

My invention relates to improvements in internal combustion engines of the general character described in my Patent No. 1,464,164 granted August 7, 1923.

In the aforesaid patent I have described an engine of the type in which the usual poppet valves controlling the intake and exhaust have been eliminated, and in which the functions of these valves are performed by means of a reciprocating, port-operating piston, the movement of which is controlled by an overhead cam.

My present invention has to do with improvements in the construction of this auxiliary port-operating piston and, in the means for controlling the actuation thereof. In addition, my present invention contemplates an improved means or method for air cooling the motor, and the development of an internal combustion engine of this general type in which the movements of the port-operating piston are so timed in respect to the movement of the power piston that marked improvements in efficiency, flexibility, and uniformity of torque over extremely wide speed ranges are attained.

It is well known that with the present type of poppet valve engine a certain valve setting or valve timing adapting the engine for high speed operation does not give satisfactory results at low speed operation, and conversely, a valve timing or setting adapting the engine for slow speed, heavy duty work is not at all suitable for high speed operation. In other words, with poppet valve engines of the present design it is impossible to attain, in a single unit, efficient operation and high torque at both extremely high speed and extremely low speed.

These difficulties arise principally through the impossibility of designing a poppet valve and the mechanism for operating the same which can be made to function quickly enough to produce the desired result. Furthermore, particularly in the construction of very large engines, the maximum horse power which can be developed per cylinder is definitely limited by reason of the practical limitations upon the size of ordinary poppet valves which can be employed.

With the present type of poppet valves requiring as much as 45 degrees of crank travel to effect an opening or closing thereof, it is well known that considerable lead must be given to the exhaust valve in order to attain satisfactory scavenging. That is, it is impossible to utilize the full expansion of the gas in the cylinder because the exhaust valve must be set to start its opening movement a considerable time before the crank reaches the lower dead center. On the other hand, with my valve action, which to the ordinary or even the expert observer appears to be very much slower than a poppet valve action, a port may be fully opened or closed in 15 degrees of crank travel.

With these inherent advantages, I have discovered that by timing the movements of my operating piston, as hereinafter set forth, my engine will attain substantially its full torque at a speed as low as 90 R. P. M. and may be operated at extremely high efficiency through all intermediate speed ranges up to 3500 or 4000 R. P. M.

The objects of my invention therefore are to provide an internal combustion engine which will operate at high efficiency through a wide range of speed. Another object is to provide an engine which will be capable of developing an extremely high torque when operating at speeds as slow as 90–100 R. P. M. Another object is to produce an engine in which it will be possible to utilize the expansive force of the burning gases throughout the full stroke of the power piston. Another object is to provide an engine which will require less cooling media than those now in use, and in which air may be utilized in a novel way for cooling the cylinders. Another object is to provide an improved cam device for controlling the movements of the port-operating piston, and in this connection to provide an improved type of port-operating piston to function therewith.

Some of these objects I attain by the use of a port-operating piston of the general character described in my Patent No. 1,464,164 but by timing the operation of this piston so that substantially no fuel is drawn into the motor until the inlet valve is full opened, or, in other words, timing it so that the volume included within the cylinder and between the port-operating piston head and the power piston head does not change substantially during the opening of the inlet port. Since the movement of the port-operating piston which opens the inlet port is a continuation of the movement closing the exhaust port, it follows, if desirable, the operation of the port piston may be so timed that there is no change in the volume mentioned during the interval of exhaust port closing.

The movement of the port-operating piston which closes the inlet port is also timed so that the volume included within the cylinder and between the pistons does not change substantially during this period of the cycle.

The effect of so synchronizing the movements of the power piston and port-operating piston when coupled with the extremely high speed at which the ports may be opened and closed is to provide not only for full expansion of the gas, but also to materially extend the intervals during which the ports are open, thereby providing for the intake of full fuel charges and perfect scavenging of the products of combustion.

Other objects are attained by the utilization of the novel elements and the combinations and arrangements thereof described below and illustrated in the accompanying drawings, in which—

Fig. 1 represents a cross section of a cylinder of my motor taken normal to the crank shaft;

Fig. 2 is a fragmentary outside elevation of Fig. 1 looking from the right hand side, and in which the upper portion of the cylinder is broken away to show the cam arrangement for actuating the port-operating piston;

Fig. 3 is an elevation view of my port-operating piston assembly as seen from the inlet port side;

Fig. 4 is a top view of Fig. 3;

Fig. 5 is a bottom view of the port-operating piston;

Fig. 10 is a diagram indicating the positions of the crank during the various stages of the cycle for one particular valve timing;

Fig. 11 is a diagrammatic view of my motor showing the exhaust port just closed and the inlet port about to open;

Fig. 12 shows the inlet port fully open;

Fig. 13 shows the relative positions of the parts as the crank approaches lower dead center on the intake stroke;

Fig. 14 shows the relative position of the parts as the inlet port begins to close;

Fig. 15 shows the position of the pistons and crank at the beginning of the compression stroke;

Fig. 16 shows the position of the pistons when the crank is on the upper dead center at the end of the compression stroke;

Fig. 17 shows the relative positions of the parts at the end of the power stroke at which time the exhaust port begins to open;

Fig. 18 shows the relative positions of the parts at the completion of the exhaust port opening movement; and Fig. 19 shows the relative position of parts as crank approaches upper dead center near the end of the exhaust stroke.

Figure 8:
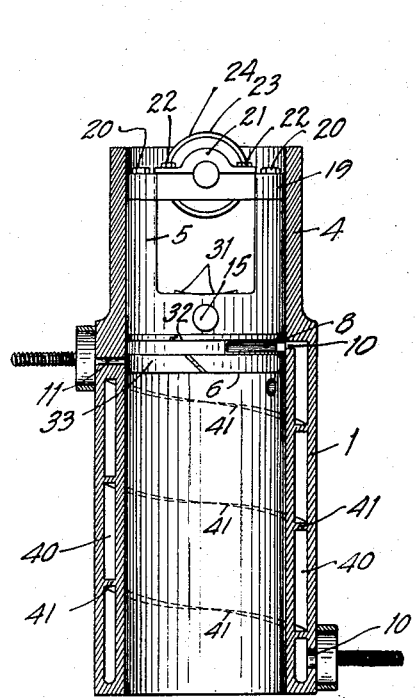
Fig. 8 is a cross sectional view through a cylinder of modified type showing an air cooling arrangement.
Figure 6:
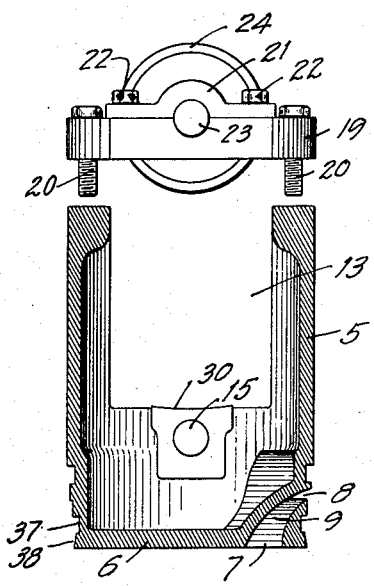
Fig. 6 is a slightly enlarged cross section of my port-operating piston.
Figure 7:
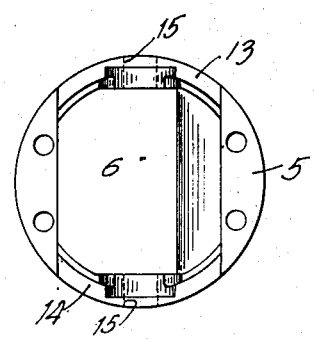
Fig. 7 is a top view of the port-operating piston with the cam bearings removed.

Referring to the drawings, 1 represents the usual cylinder provided with a power piston 2 having a connecting rod 3. The cylinder 1 is extended upwardly a substantial distance above the upper limit of movement of the power piston, as shown at 4, and within the extended portion is fitted the port-operating piston 5. This piston is inverted, and its head 6 forms a closure for the top of the combustion chamber.

The port-operating piston is, in general, quite similar to the corresponding element described in my patent aforesaid. It is provided with an opening 7 in the head and an opening 8 in the side, quite near the bottom, and these openings are connected by the passage 9 through which the fuel charge is introduced into the engine. As in my previous invention, this passage preferably tapers or is reduced in size from the side to the head of the piston so that a venturi-like passage is provided for the gas.

The cylinder walls are provided with an inlet passage or port 10 and an exhaust passage or port 11. The opening and closing of these ports are effected by reciprocating movements of the port-operating piston which, during the compression and expansion, portions of the cycle maintains both ports closed. The inlet port is disposed at a higher elevation than the exhaust port and both extend a sufficient distance around the periphery of the cylinder to provide the necessary port area. In this connection it might be well to state that it is desirable, to effect an opening and closing of the ports with as small a movement of the port-operating piston as possible. This being so, it is advantageous to attain the required port area by extending the ports around the cylinder as far as practicable, thereby reducing the vertical depth of the ports to a minimum.

The movements of the port-operating piston are controlled by an overhead cam shaft 12 extending longitudinally of the motor, parallel to the crank shaft, and operated at one-half the crank shaft speed by means of gears, or a chain 13' running over sprockets on both shafts. Mounted upon or forming an integral part of the cam shaft 12 are a plurality of cams, three over each cylinder, which coact with bearings or other surfaces, such as discs, secured to or forming a part of the port-operating pistons to control the actuation thereof. In Figs. 1 and 2, I have shown five cams over the cylinder, three of which are actuating or controlling cams, and two of which serve to relieve the actuating or controlling cams from the force of the expanding gas in the cylinder. Since the cam shaft extends through the port-operating piston, the sides of this piston are cut out or open as shown at 13 and 14. Between the head 6 and the cut-out zones 13 and 14 the piston 5 is provided with diametrically opposed circular openings 15 adapted to receive the pin 16 similar to the wrist pin of a power cylinder, and upon which are mounted two discs or bearings 17 and 18. Upon the top of piston 5 is a cap 19 secured thereto by cap screws 20. Secured to the cap by suitable means, such as the straps 21 and cap screws 22 is a short pin or shaft 23 upon which is centrally mounted a disc or bearing 24.

As stated above, the cam shaft 12 is provided with three cams which coact with the three roller bearings or discs just described to actuate and control the port-operating piston. The cam 25 coacts with bearing 24 and the cams 26 and 27 coact with the bearings 17 and 18, respectively. These cams are always in contact with the respective bearing with which they coact and therefore effect a positive actuation of the port-operating piston.

If desired, two additional cams 28 and 29, respectively, may be provided on the cam shaft to coact with surfaces 30 and 31, respectively, on the piston. These last mentioned cams and surfaces are intended to coact only during the explosion and expansion portions of the cycle and are designed to relieve the bearings of any excessive stress resulting therefrom.

Figure 9:
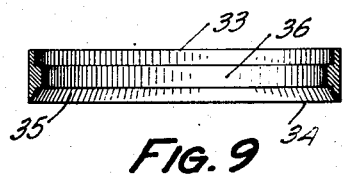
Fig. 9 is a cross sectional view of the lower piston ring upon my port-operating piston.

To prevent leakage between the walls of the cylinder and the port operating piston, I provide the latter with one or more compression rings 32 disposed above the opening 8 in piston 5. These rings may be of the ordinary well known type. Below the opening 8 I preferably provide a single port-sealing ring 33 made in the form shown in Fig. 9. This ring is comparatively wide and the lower edge 34 in contact with the cylinder is sharp and beveled inwardly, as shown at 35. This ring is provided with a central annular rib 36 adapted to fit within the annular slot 37 provided in the piston, and the portion of the piston below the slot 37 is provided with a bevel 38 complementary to the bevel 35 on the ring. The ring 33 thus embraces the piston above and below the slot 37 and being of considerably greater width or depth than the vertical depth of the ports 10 and 11 passes readily thereover. By beveling the lower edge of the ring it is obvious that the pressure of the gases in the combustion chamber will tend to expand the ring and force it tightly against the cylinder walls.

My motor runs very much cooler than any other motor of which I am aware, and no water jackets or other means for cooling the cylinder are necessary above the exhaust port. The port-operating piston is adequately cooled by the incoming fuel, and, on account of the exceptionally large charge drawn into the cylinder, the full expansion of the burning gases, and the refrigerating effect created by the expansion of the gases in issuing into the combustion chamber through the restriction 7 with thin cylinder walls my motor will operate very efficiently without any cooling media whatever other than the atmospheric air which normally circulates about the motor.

Referring to Fig. 8, however, I have here shown how it is possible to maintain a forced circulation of air about the cylinder without the use of auxiliary blowers and the like. Instead of the ordinary water jacket 39 shown in Fig. 1, I have provided an air jacket 40 which forms or may form a part of the intake manifold and through which the air or air and fuel is drawn to the inlet port 10. This jacket may be provided with spiral or other baffles 41 which will insure a circulation of fluid about all sides of the cylinder.

The operation of my motor and the design of the special port-operating piston cams will be best understood from a consideration of Figs. 10 to 19 inclusive, showing various phases of the cycle. In the following discussion, and in the claims, I mean by the term "combustion chamber" the volume included at any time in the cylinder above the head of the power piston.

Within practical limits and for engines of the ordinary automotive type and size, it may be said said there is no appreciable movement of the power piston during the interval when the crank is moving within the zones defined by an angle of about 10 degrees each side of the upper and lower dead centers. In other words, during this crank travel the power piston creates no substantial volume displacement in the cylinder. Hence, if it is possible to provide an exhaust port of comparatively large size and some means for fully opening this port in say 15 degrees of crank travel, it will be possible to allow the exploded gases to expand for the full travel of the power piston and yet have the exhaust port fully opened before the power piston starts its scavenging upward stroke.

Likewise, with a quick acting valve mechanism of this character combined with a means for maintaining a combustion chamber of approximately constant volume while the crank pin is actually moving away from the upper dead center (so that no partial vacuum is created in the combustion chamber) it is possible to maintain the exhaust port open for an interval of say 10 or 15 degrees past upper dead center and to delay the full opening of the inlet port during such interval as the volume of the combustion chamber is maintained substantially constant, thus preventing the formation of any partial vacuum in the combustion chamber and only beginning to draw gas into the chamber after the inlet port is fully open.

After the inlet port is fully opened, it may remain so for an appreciable crank angle past lower dead center, say 10 degrees, and if some means is provided for maintaining the volume of the combustion chamber containing the gas charge approximately constant for a limited interval, during which time the power piston is actually moving upward after the crank has passed 10 degrees away from lower dead center, this interval may be utilized in closing the inlet port without producing any compression whatever or forcing any of the charge back through the inlet port.

By means of my valve action either port may be fully opened or fully closed in 15 degrees of crank travel, and Fig. 10 illustrates a typical valve timing diagram which may be used in laying out the cams. It is to be understood, of course, that the vertical depth of the port openings will necessarily determine the vertical movement which must be provided by the cams; and that the diagram is merely illustrative of the principle involved and is in no sense a limitation as to the precise angular relations necessary because these, of course, will vary somewhat with the stroke of the piston.

Referring now more particularly to Figs. 11 to 19, Fig. 11 shows the relative positions of the pistons as the port-operating piston 5 begins its downward movement to open the inlet port. The crank is here shown about 10 degrees past upper dead center. For the next 5 degrees of crank travel, the opening 8 in piston 5 is moving toward port 10 and during the next 15 degrees of crank travel the inlet port is fully opened, as shown in Fig. 12. This downward movement of piston 5 is effected by cams 26 and 27 which are so formed as to synchronize this movement with the movement of piston 2. That is, the distance A between the heads of the pistons remains approximately constant during the inlet-port-opening movement of piston 5 and is not changed until the port is fully opened.

Fig. 13 shows the crank within 10 degrees of and approaching the lower dead center near the end of the intake stroke. During the next 20 degrees of crank travel there is no appreciable movement of the power piston 2 and the inlet port remains open to insure the indrawing of a full charge. That is, distance B in Fig. 13 approximately equals distance B in Fig. 14. About 10 degres past lower dead center (Fig. 14), piston 5 begins its upward movement to close port 10 and port 10 is fully closed after the next 15 degrees to crank travel, or when the pistons have reached the relative positions shown in Fig. 15. The upward, inlet-port-closing movement of piston 5 is effected by cam 25 which is so formed as to synchronize this movement with the upward movement of piston 2. That is, the d's-tance B in Fig. 14 is approximately equal to the distance B in Fig. 15, and there is no tendency to force any part of the charge back through the intake port.

Figs. 16 and 17 show the relative position of the parts at the beginning of the power stroke and at the end of the gas expansion period, respectively. In Fig. 17 the crank is about 10 degrees from and approaching lower dead center. For the next twenty degrees of crank travel from this point there is no appreciable movement of the power piston and this period is utilized to effect a full opening of the exhaust port. When the power piston reaches the position shown in Fig. 17, the gas is fully expanded, and the stroke of the motor may be so established as to attain maximum efficiency. The upward movement of piston 5 to open the exhaust port is positively controlled by cam 25 and may be said to be effected both by the cam action and by the pressure of the gases in the cylinder.

Fig. 18 shows the exhaust port fully opened when the crank is 5 degrees past bottom dead center, or when piston 2 starts its upward movement, and it may remain fully open until piston 2 starts its downward movement closing the exhaust port and opening the inlet port.

From the foregoing it will be apparent that I have provided a valve action and timing for an internal combustion engine in which no fuel is drawn into the cylinder until the intake port or valve is fully opened. Because of the extremely fast action of my valve port opening and closing mechanism it is possible to utilize the full expansion of the gas thereby permitting my motor to operate without the necessity of water cooling or forced air cooling.

Unlike the ordinary poppet valve motor there is no practical limitation on cylinder diameter or stroke, and my motors may be of any size or power. Full torque is attained at very low speeds and maintained through all intermediate speeds up to the maximum. The port opening and closing mechanism is positive in its action and the motor may be operated either at extremely low or extremely high speeds at substantially the same efficiency.

The motor operates with either gasoline or kerosene as a fuel and, except for starting, operates very well on distillate.

What I claim is:

1. An internal combustion engine comprising a cylinder having a power piston therein and provided with a combustion chamber and inlet and exhaust port above said power piston, means for opening and closing said ports, and means for timing the operation of the inlet port opening means so that said port is open to a substantial degree before fuel is drawn therethrough by the downward movement of the power piston.

2. An internal combustion engine comprising a cylinder having a power piston therein and provided with a combustion chamber and inlet and exhaust port above said power piston, means for opening and closing said ports, and means for timing the operation of the inlet port opening means so that said port is substantially fully opened before fuel is drawn therethrough by the downward movement of the power piston.

3. An internal combustion engine comprising a cylinder having a power piston therein and provided with a combustion chamber and inlet and exhaust port above said power piston, means for opening and closing said ports, and means for synchronizing the operation of the inlet port closing means with the movement of the power piston so that the volume of the combustion chamber remains approximately constant during the closing of said inlet port.

4. An internal combustion engine comprising a cylinder having a power piston therein and provided with a combustion chamber and inlet and exhaust port above said power piston, means for opening and closing said ports, and means for synchronizing the operation of the inlet port opening means with the movement of the power piston so that the volume of the combustion chamber remains approximately constant during the opening of said inlet port.

5. An internal combustion engine comprising a cylinder provided with inlet and exhaust ports, a power piston and a port-operating piston in said cylinder enclosing a combustion chamber therebetween, means for positively actuating said port-operating piston to both open and close said inlet port, and means for synchronizing the movements of said pistons so that the volume of the combustion chamber is not substantially changed while the inlet port is opening.

6. An internal combustion engine comprising a cylinder provided with inlet and exhaust ports, a power piston and a port-operating piston in said cylinder enclosing a combustion chamber therebetween, means for positively actuating said port-operating piston to both open and close said inlet port, and means for synchronizing the movements of said pistons so that the volume of the combustion chamber is not substantially changed while the inlet port is closing.

7. An internal combustion engine comprising a cylinder provided with inlet and exhaust ports, a power piston, a port-operating piston having a passage for the inflow of fuel extending from a side thereof through the head and adapted to be brought into and out of communication with said inlet port, said pistons enclosing a combustion chamber therebetween, and means for positively moving said port-operating piston in the same direction as the power piston and at substantially the same speed during the interval when said inlet port is opening, whereby the volume of the combustion chamber is not substantially reduced during said movement.

8. An internal combustion engine comprising a cylinder provided with inlet and exhaust ports, a power piston, a port-operating piston having a passage for the inflow of fuel extending from a side thereof through the head and adapted to be brought into and out of communication with said inlet port, said pistons enclosing a combustion chamber therebetween, and means for positively moving said port-operating piston in the same direction as the power piston and at substantially the same speed during the interval when said inlet port is closing, whereby the volume of the combustion chamber is not substantially reduced during said movement.

9. An internal combustion engine comprising a cylinder provided with inlet and exhaust ports, a power piston, a port-operating piston having a passage for the inflow of fuel extending from a side thereof through the head and adapted to be brought into and out of communication with said inlet port, said pistons enclosing a combustion chamber therebetween, and means for positively moving said port-operating piston in the same direction as the power piston and at substantially the same speed during the intervals when said inlet port is opening and closing, whereby the volume of the combustion chamber is not substantially changed during said intervals.

10. In an internal combustion engine comprising a cylinder provided with inlet and exhaust ports and a combustion chamber, the combination with a power piston in said cylinder, of means for opening the inlet port after the power piston has passed the upper dead center and means for maintaining the volume of the combustion chamber approximately constant while said port is opening.

11. In an internal combustion engine comprising a cylinder provided with inlet and exhaust ports and a combustion chamber, the combination with a power piston in said cylinder, of means for closing the inlet port after the power piston has passed the lower dead center and means for preventing backflow of the fuel charge through said inlet port due to the upward movement of the power piston, while said port is closing.

12. In an internal combustion engine comprising a cylinder provided with inlet and exhaust ports and a combustion chamber, the combination with a power piston in said cylinder, of means for maintaining each of said ports open during a crank travel substantially in excess of 180°, including means for preventing backflow of the fuel charge through said inlet port while said port is open.

FRANK C. ALARIE.